US008050463B2

United States Patent
Hamza (10) Patent No.: US 8,050,463 B2
(45) Date of Patent: Nov. 1, 2011

(54) IRIS RECOGNITION SYSTEM HAVING IMAGE QUALITY METRICS

(75) Inventor: Rida M. Hamza, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 1125 days.

(21) Appl. No.: 11/681,614

(22) Filed: Mar. 2, 2007

(65) Prior Publication Data

US 2007/0274570 A1 Nov. 29, 2007

Related U.S. Application Data

(63) Continuation-in-part of application No. 11/275,703, filed on Jan. 25, 2006, now Pat. No. 7,593,550, application No. 11/681,614, which is a continuation-in-part of application No. 11/043,366, filed on Jan. 26, 2005, now Pat. No. 7,756,301, and a continuation-in-part of application No. 11/372,854, filed on Mar. 10, 2006, and a continuation-in-part of application No. 11/672,108, filed on Feb. 7, 2007, and a continuation-in-part of application No. 11/675,424, filed on Feb. 15, 2007.

(60) Provisional application No. 60/778,770, filed on Mar. 3, 2006, provisional application No. 60/647,270, filed on Jan. 26, 2005.

(51) Int. Cl.
*G06K 9/00* (2006.01)

(52) U.S. Cl. .......................................... 382/115; 382/117

(58) Field of Classification Search .................. 382/103, 382/115, 117, 118, 154; 356/4.03, 4.04, 356/4.05, 4.06, 4.07, 18, 492, 493, 496, 498
See application file for complete search history.

(56) References Cited

U.S. PATENT DOCUMENTS

| 4,641,349 | A | 2/1987 | Flom et al. |
|---|---|---|---|
| 4,836,670 | A | 6/1989 | Hutchinson |
| 5,231,674 | A | 7/1993 | Cleveland et al. |
| 5,291,560 | A | 3/1994 | Daugman |
| 5,293,427 | A | 3/1994 | Ueno et al. |
| 5,359,382 | A | 10/1994 | Uenaka |
| 5,404,013 | A | 4/1995 | Tajima |
| 5,551,027 | A | 8/1996 | Choy et al. |
| 5,572,596 | A | 11/1996 | Wildes et al. |
| 5,608,472 | A | 3/1997 | Szirth et al. |

(Continued)

FOREIGN PATENT DOCUMENTS

EP 0484076 5/1992

(Continued)

OTHER PUBLICATIONS

Chen et al., "Localized Iris Image Quality Using 2-D Wavelets," LNCS 3832, pp. 373-381, 2005.

(Continued)

*Primary Examiner* — Brian Q Le
(74) *Attorney, Agent, or Firm* — Seager, Tufte & Wickhem LLC (57) ABSTRACT

An iris recognition system implementing image quality metrics to assess the quality of an acquired eye image for reliable operation. Images with low image quality may be rejected or flagged based upon the application. The image quality may be determined with a preprocessing module in the recognition system. The processing may be configured based on a quality assessment.

18 Claims, 6 Drawing Sheets

U.S. PATENT DOCUMENTS

| | | |
|---|---|---|
| 5,664,239 A | 9/1997 | Nakata |
| 5,717,512 A | 2/1998 | Chmielewski, Jr. et al. |
| 5,751,836 A | 5/1998 | Wildes et al. |
| 5,859,686 A | 1/1999 | Aboutalib et al. |
| 5,860,032 A | 1/1999 | Iwane |
| 5,896,174 A | 4/1999 | Nakata |
| 5,901,238 A | 5/1999 | Matsushita |
| 5,909,269 A | 6/1999 | Isogai et al. |
| 5,953,440 A | 9/1999 | Zhang et al. |
| 5,956,122 A | 9/1999 | Doster |
| 5,978,494 A | 11/1999 | Zhang |
| 6,005,704 A | 12/1999 | Chmielewski, Jr. et al. |
| 6,007,202 A | 12/1999 | Apple et al. |
| 6,012,376 A | 1/2000 | Hanke et al. |
| 6,021,210 A | 2/2000 | Camus et al. |
| 6,028,949 A | 2/2000 | McKendall |
| 6,055,322 A | 4/2000 | Salganicoff et al. |
| 6,064,752 A | 5/2000 | Rozmus et al. |
| 6,069,967 A | 5/2000 | Rozmus et al. |
| 6,081,607 A | 6/2000 | Mori et al. |
| 6,088,470 A | 7/2000 | Camus et al. |
| 6,091,899 A | 7/2000 | Konishi et al. |
| 6,101,477 A | 8/2000 | Hohle et al. |
| 6,104,431 A | 8/2000 | Inoue et al. |
| 6,108,636 A | 8/2000 | Yap et al. |
| 6,119,096 A | 9/2000 | Mann et al. |
| 6,120,461 A | 9/2000 | Smyth |
| 6,134,339 A | 10/2000 | Luo |
| 6,144,754 A | 11/2000 | Okano et al. |
| 6,246,751 B1 | 6/2001 | Bergl et al. |
| 6,247,813 B1 | 6/2001 | Kim et al. |
| 6,252,977 B1 | 6/2001 | Salganicoff et al. |
| 6,282,475 B1 | 8/2001 | Washington |
| 6,285,505 B1 | 9/2001 | Melville et al. |
| 6,285,780 B1 | 9/2001 | Yamakita et al. |
| 6,289,113 B1 | 9/2001 | McHugh et al. |
| 6,299,306 B1 | 10/2001 | Braithwaite et al. |
| 6,308,015 B1 | 10/2001 | Matsumoto |
| 6,309,069 B1 | 10/2001 | Seal et al. |
| 6,320,610 B1 | 11/2001 | Van Sant et al. |
| 6,320,612 B1 | 11/2001 | Young |
| 6,320,973 B2 | 11/2001 | Suzaki et al. |
| 6,323,761 B1 | 11/2001 | Son |
| 6,325,765 B1 | 12/2001 | Hay et al. |
| 6,330,674 B1 | 12/2001 | Angelo et al. |
| 6,332,193 B1 | 12/2001 | Glass et al. |
| 6,344,683 B1 | 2/2002 | Kim |
| 6,370,260 B1 | 4/2002 | Pavlidis et al. |
| 6,377,699 B1 | 4/2002 | Musgrave et al. |
| 6,393,136 B1 | 5/2002 | Amir et al. |
| 6,400,835 B1 | 6/2002 | Lemelson et al. |
| 6,424,727 B1 | 7/2002 | Musgrave et al. |
| 6,424,845 B1 | 7/2002 | Emmoft et al. |
| 6,433,818 B1 | 8/2002 | Steinberg et al. |
| 6,438,752 B1 | 8/2002 | McClard |
| 6,441,482 B1 | 8/2002 | Foster |
| 6,446,045 B1 | 9/2002 | Stone et al. |
| 6,483,930 B1 | 11/2002 | Musgrave et al. |
| 6,484,936 B1 | 11/2002 | Nicoll et al. |
| 6,490,443 B1 | 12/2002 | Freeny, Jr. |
| 6,493,363 B1 | 12/2002 | Weaver et al. |
| 6,493,669 B1 | 12/2002 | Curry et al. |
| 6,494,363 B1 | 12/2002 | Roger et al. |
| 6,503,163 B1 | 1/2003 | Van Sant et al. |
| 6,505,193 B1 | 1/2003 | Musgrave et al. |
| 6,506,078 B1 | 1/2003 | Mori et al. |
| 6,508,397 B1 | 1/2003 | Do |
| 6,516,078 B1 | 2/2003 | Yang et al. |
| 6,516,087 B1 | 2/2003 | Camus |
| 6,516,416 B2 | 2/2003 | Gregg et al. |
| 6,522,772 B1 | 2/2003 | Morrison et al. |
| 6,523,165 B2 | 2/2003 | Liu et al. |
| 6,526,160 B1 | 2/2003 | Ito |
| 6,532,298 B1 | 3/2003 | Cambier et al. |
| 6,540,392 B1 | 4/2003 | Braithwaite |
| 6,542,624 B1 | 4/2003 | Oda |
| 6,546,121 B1 | 4/2003 | Oda |
| 6,553,494 B1 | 4/2003 | Glass |
| 6,580,356 B1 | 6/2003 | Alt et al. |
| 6,591,001 B1 | 7/2003 | Oda et al. |
| 6,591,064 B2 | 7/2003 | Higashiyama et al. |
| 6,594,377 B1 | 7/2003 | Kim et al. |
| 6,594,399 B1 | 7/2003 | Camus et al. |
| 6,598,971 B2 | 7/2003 | Cleveland |
| 6,600,878 B2 | 7/2003 | Pregara |
| 6,614,919 B1 | 9/2003 | Suzaki et al. |
| 6,652,099 B2 | 11/2003 | Chae et al. |
| 6,674,367 B2 | 1/2004 | Sweatte |
| 6,690,997 B2 | 2/2004 | Rivalto |
| 6,708,176 B2 | 3/2004 | Strunk et al. |
| 6,711,562 B1 | 3/2004 | Ross et al. |
| 6,714,665 B1 | 3/2004 | Hanna et al. |
| 6,718,049 B2 | 4/2004 | Pavlidis et al. |
| 6,718,665 B2 | 4/2004 | Hess et al. |
| 6,732,278 B2 | 5/2004 | Baird, III et al. |
| 6,734,783 B1 | 5/2004 | Anbai |
| 6,745,520 B2 | 6/2004 | Puskaric et al. |
| 6,750,435 B2 | 6/2004 | Ford |
| 6,751,733 B1 | 6/2004 | Nakamura et al. |
| 6,753,919 B1 | 6/2004 | Daugman |
| 6,754,640 B2 | 6/2004 | Bozeman |
| 6,760,467 B1 | 7/2004 | Min et al. |
| 6,765,470 B2 | 7/2004 | Shinzaki |
| 6,766,041 B2 | 7/2004 | Golden et al. |
| 6,775,774 B1 | 8/2004 | Harper |
| 6,785,406 B1 | 8/2004 | Kamada |
| 6,793,134 B2 | 9/2004 | Clark |
| 6,819,219 B1 | 11/2004 | Bolle et al. |
| 6,829,370 B1 | 12/2004 | Pavlidis et al. |
| 6,832,044 B2 | 12/2004 | Doi et al. |
| 6,836,554 B1 | 12/2004 | Bolle et al. |
| 6,837,436 B2 | 1/2005 | Swartz et al. |
| 6,845,879 B2 | 1/2005 | Park |
| 6,853,444 B2 | 2/2005 | Haddad |
| 6,867,683 B2 | 3/2005 | Calvesio et al. |
| 6,873,960 B1 | 3/2005 | Wood et al. |
| 6,896,187 B2 | 5/2005 | Stockhammer |
| 6,905,411 B2 | 6/2005 | Nguyen et al. |
| 6,920,237 B2 | 7/2005 | Chen et al. |
| 6,930,707 B2 | 8/2005 | Bates et al. |
| 6,934,849 B2 | 8/2005 | Kramer et al. |
| 6,950,139 B2 | 9/2005 | Fujinawa |
| 6,954,738 B2 | 10/2005 | Wang et al. |
| 6,957,341 B2 | 10/2005 | Rice et al. |
| 6,972,797 B2 | 12/2005 | Izumi |
| 6,992,562 B2 | 1/2006 | Fuks et al. |
| 7,053,948 B2 | 5/2006 | Konishi |
| 7,058,209 B2 * | 6/2006 | Chen et al. ............ 382/117 |
| 7,071,971 B2 | 7/2006 | Elberbaum |
| 7,084,904 B2 | 8/2006 | Liu et al. |
| 7,136,581 B2 | 11/2006 | Fujii |
| 7,183,895 B2 | 2/2007 | Bazakos et al. |
| 7,184,577 B2 | 2/2007 | Chen et al. |
| 7,197,173 B2 | 3/2007 | Jones et al. |
| 7,204,425 B2 | 4/2007 | Mosher, Jr. et al. |
| 7,239,726 B2 * | 7/2007 | Li ........................ 382/118 |
| 7,277,561 B2 | 10/2007 | Shin |
| 7,277,891 B2 | 10/2007 | Howard et al. |
| 7,298,873 B2 | 11/2007 | Miller, Jr. et al. |
| 7,315,233 B2 | 1/2008 | Yuhara |
| 7,331,667 B2 * | 2/2008 | Grotehusmann et al. ..... 351/205 |
| 7,362,210 B2 | 4/2008 | Bazakos et al. |
| 7,362,370 B2 | 4/2008 | Sakamoto et al. |
| 7,362,884 B2 | 4/2008 | Willis et al. |
| 7,365,771 B2 | 4/2008 | Kahn et al. |
| 7,406,184 B2 | 7/2008 | Wolff et al. |
| 7,414,648 B2 | 8/2008 | Imada |
| 7,417,682 B2 | 8/2008 | Kuwakino et al. |
| 7,418,115 B2 | 8/2008 | Northcott et al. |
| 7,421,097 B2 | 9/2008 | Hamza et al. |
| 7,443,441 B2 | 10/2008 | Hiraoka |
| 7,460,693 B2 | 12/2008 | Loy et al. |
| 7,471,451 B2 | 12/2008 | Dent et al. |
| 7,486,806 B2 | 2/2009 | Azuma et al. |
| 7,518,651 B2 | 4/2009 | Butterworth |
| 7,537,568 B2 | 5/2009 | Moehring |
| 7,538,326 B2 | 5/2009 | Johnson et al. |

| | | | | | | |
|---|---|---|---|---|---|---|
| 7,542,945 B2 | 6/2009 | Thompson et al. | | 2003/0118212 A1 | 6/2003 | Min et al. |
| 7,580,620 B2 | 8/2009 | Raskar et al. | | 2003/0118217 A1 | 6/2003 | Kondo et al. |
| 7,593,550 B2 | 9/2009 | Hamza | | 2003/0123711 A1 | 7/2003 | Kim et al. |
| 7,639,846 B2 | 12/2009 | Yoda | | 2003/0125054 A1 | 7/2003 | Garcia |
| 7,722,461 B2 | 5/2010 | Gatto et al. | | 2003/0125057 A1 | 7/2003 | Pesola |
| 7,751,598 B2 | 7/2010 | Matey et al. | | 2003/0126560 A1 | 7/2003 | Kurapati et al. |
| 7,756,301 B2 | 7/2010 | Hamza | | 2003/0131245 A1 | 7/2003 | Linderman |
| 7,756,407 B2 | 7/2010 | Raskar | | 2003/0131265 A1 | 7/2003 | Bhakta |
| 7,761,453 B2 | 7/2010 | Hamza | | 2003/0133597 A1 | 7/2003 | Moore et al. |
| 7,777,802 B2 | 8/2010 | Shinohara et al. | | 2003/0140235 A1 | 7/2003 | Immega et al. |
| 7,804,982 B2 | 9/2010 | Howard et al. | | 2003/0140928 A1 | 7/2003 | Bui et al. |
| 2001/0026632 A1 | 10/2001 | Tamai | | 2003/0141411 A1 | 7/2003 | Pandya et al. |
| 2001/0027116 A1 | 10/2001 | Baird | | 2003/0149881 A1 | 8/2003 | Patel et al. |
| 2001/0047479 A1 | 11/2001 | Bromba et al. | | 2003/0152251 A1 | 8/2003 | Ike |
| 2001/0051924 A1 | 12/2001 | Uberti | | 2003/0152252 A1 | 8/2003 | Kondo et al. |
| 2001/0054154 A1 | 12/2001 | Tam | | 2003/0156741 A1 | 8/2003 | Lee et al. |
| 2002/0010857 A1 | 1/2002 | Karthik | | 2003/0158762 A1 | 8/2003 | Wu |
| 2002/0033896 A1 | 3/2002 | Hatano | | 2003/0158821 A1 | 8/2003 | Maia |
| 2002/0039433 A1 | 4/2002 | Shin | | 2003/0159051 A1 | 8/2003 | Hollnagel |
| 2002/0040434 A1 | 4/2002 | Elliston et al. | | 2003/0163739 A1 | 8/2003 | Armington et al. |
| 2002/0062280 A1 | 5/2002 | Zachariassen et al. | | 2003/0169334 A1 | 9/2003 | Braithwaite et al. |
| 2002/0077841 A1 | 6/2002 | Thompson | | 2003/0169901 A1 | 9/2003 | Pavlidis et al. |
| 2002/0089157 A1 | 7/2002 | Breed et al. | | 2003/0169907 A1 | 9/2003 | Edwards et al. |
| 2002/0106113 A1 | 8/2002 | Park | | 2003/0173408 A1 | 9/2003 | Mosher, Jr. et al. |
| 2002/0112177 A1 | 8/2002 | Voltmer et al. | | 2003/0174049 A1 | 9/2003 | Beigel et al. |
| 2002/0114495 A1 | 8/2002 | Chen et al. | | 2003/0177051 A1 | 9/2003 | Driscoll et al. |
| 2002/0130961 A1 | 9/2002 | Lee et al. | | 2003/0182151 A1 | 9/2003 | Taslitz |
| 2002/0131622 A1 | 9/2002 | Lee et al. | | 2003/0182182 A1 | 9/2003 | Kocher |
| 2002/0139842 A1 | 10/2002 | Swaine | | 2003/0189480 A1 | 10/2003 | Hamid |
| 2002/0140715 A1 | 10/2002 | Smet | | 2003/0189481 A1 | 10/2003 | Hamid |
| 2002/0142844 A1 | 10/2002 | Kerr | | 2003/0191949 A1 | 10/2003 | Odagawa |
| 2002/0144128 A1 | 10/2002 | Rahman et al. | | 2003/0194112 A1 | 10/2003 | Lee |
| 2002/0150281 A1 | 10/2002 | Cho | | 2003/0195935 A1 | 10/2003 | Leeper |
| 2002/0154794 A1 | 10/2002 | Cho | | 2003/0198368 A1 | 10/2003 | Kee |
| 2002/0158750 A1 | 10/2002 | Almalik | | 2003/0200180 A1 | 10/2003 | Phelan, III et al. |
| 2002/0164054 A1 | 11/2002 | McCartney et al. | | 2003/0210139 A1 | 11/2003 | Brooks et al. |
| 2002/0175182 A1 | 11/2002 | Matthews | | 2003/0210802 A1 | 11/2003 | Schuessler |
| 2002/0186131 A1 | 12/2002 | Fettis | | 2003/0218719 A1 | 11/2003 | Abourizk et al. |
| 2002/0191075 A1 | 12/2002 | Doi et al. | | 2003/0225711 A1 | 12/2003 | Paping |
| 2002/0191076 A1 | 12/2002 | Wada et al. | | 2003/0228898 A1 | 12/2003 | Rowe |
| 2002/0194128 A1 | 12/2002 | Maritzen et al. | | 2003/0233556 A1 | 12/2003 | Angelo et al. |
| 2002/0194131 A1 | 12/2002 | Dick | | 2003/0235326 A1 | 12/2003 | Morikawa et al. |
| 2002/0198731 A1 | 12/2002 | Barnes et al. | | 2003/0235411 A1 | 12/2003 | Morikawa et al. |
| 2003/0002714 A1 | 1/2003 | Wakiyama | | 2003/0236120 A1 | 12/2003 | Reece et al. |
| 2003/0012413 A1 | 1/2003 | Kusakari et al. | | 2004/0001614 A1 | 1/2004 | Russon et al. |
| 2003/0014372 A1 | 1/2003 | Wheeler et al. | | 2004/0002894 A1 | 1/2004 | Kocher |
| 2003/0020828 A1 | 1/2003 | Ooi et al. | | 2004/0005078 A1 | 1/2004 | Tillotson |
| 2003/0038173 A1 | 2/2003 | Blackson et al. | | 2004/0006553 A1 | 1/2004 | de Vries et al. |
| 2003/0046228 A1 | 3/2003 | Berney | | 2004/0010462 A1 | 1/2004 | Moon et al. |
| 2003/0053663 A1 | 3/2003 | Chen et al. | | 2004/0012760 A1 | 1/2004 | Mihashi et al. |
| 2003/0055689 A1 | 3/2003 | Block et al. | | 2004/0019570 A1 | 1/2004 | Bolle et al. |
| 2003/0055787 A1 | 3/2003 | Fujii | | 2004/0023664 A1 | 2/2004 | Mirouze et al. |
| 2003/0058492 A1 | 3/2003 | Wakiyama | | 2004/0023709 A1 | 2/2004 | Beaulieu et al. |
| 2003/0061172 A1 | 3/2003 | Robinson | | 2004/0025030 A1 | 2/2004 | Corbett-Clark et al. |
| 2003/0061233 A1 | 3/2003 | Manasse et al. | | 2004/0025031 A1 | 2/2004 | Ooi et al. |
| 2003/0065626 A1 | 4/2003 | Allen | | 2004/0025053 A1 | 2/2004 | Hayward |
| 2003/0071743 A1 | 4/2003 | Seah et al. | | 2004/0029564 A1 | 2/2004 | Hodge |
| 2003/0072475 A1 | 4/2003 | Tamori | | 2004/0030930 A1 | 2/2004 | Nomura |
| 2003/0073499 A1 | 4/2003 | Reece | | 2004/0035123 A1 | 2/2004 | Kim et al. |
| 2003/0074317 A1 | 4/2003 | Hofi | | 2004/0037450 A1 | 2/2004 | Bradski |
| 2003/0074326 A1 | 4/2003 | Byers | | 2004/0039914 A1 | 2/2004 | Barr et al. |
| 2003/0076161 A1 | 4/2003 | Tisse | | 2004/0042641 A1 | 3/2004 | Jakubowski |
| 2003/0076300 A1 | 4/2003 | Lauper et al. | | 2004/0044627 A1 | 3/2004 | Russell et al. |
| 2003/0076984 A1 | 4/2003 | Tisse et al. | | 2004/0046640 A1 | 3/2004 | Jourdain et al. |
| 2003/0080194 A1 | 5/2003 | O'Hara et al. | | 2004/0049687 A1 | 3/2004 | Orsini et al. |
| 2003/0091215 A1 | 5/2003 | Lauper et al. | | 2004/0050924 A1 | 3/2004 | Mletzko et al. |
| 2003/0092489 A1 | 5/2003 | Veradej | | 2004/0050930 A1 | 3/2004 | Rowe |
| 2003/0095689 A1 | 5/2003 | Volkommer et al. | | 2004/0052405 A1 | 3/2004 | Walfridsson |
| 2003/0098776 A1 | 5/2003 | Friedli | | 2004/0052418 A1 | 3/2004 | DeLean |
| 2003/0099379 A1 | 5/2003 | Monk et al. | | 2004/0059590 A1 | 3/2004 | Mercredi et al. |
| 2003/0099381 A1 | 5/2003 | Ohba | | 2004/0059953 A1 | 3/2004 | Purnell |
| 2003/0103652 A1 | 6/2003 | Lee et al. | | 2004/0104266 A1 | 6/2004 | Bolle et al. |
| 2003/0107097 A1 | 6/2003 | McArthur et al. | | 2004/0117636 A1 | 6/2004 | Cheng |
| 2003/0107645 A1 | 6/2003 | Yoon | | 2004/0133804 A1 | 7/2004 | Smith et al. |
| 2003/0108224 A1 | 6/2003 | Ike | | 2004/0146187 A1 | 7/2004 | Jeng |
| 2003/0108225 A1 | 6/2003 | Li | | 2004/0148526 A1 | 7/2004 | Sands et al. |
| 2003/0115148 A1 | 6/2003 | Takhar | | 2004/0160518 A1 | 8/2004 | Park |
| 2003/0115459 A1 | 6/2003 | Monk | | 2004/0162870 A1 | 8/2004 | Matsuzaki et al. |
| 2003/0116630 A1 | 6/2003 | Carey et al. | | 2004/0162984 A1 | 8/2004 | Freeman et al. |

| | | | | | |
|---|---|---|---|---|---|
| 2004/0169817 A1 | 9/2004 | Grotehusmann et al. | EP | 0962894 | 12/1999 |
| 2004/0172541 A1 | 9/2004 | Ando et al. | EP | 1018297 | 7/2000 |
| 2004/0174070 A1 | 9/2004 | Voda et al. | EP | 1024463 | 8/2000 |
| 2004/0190759 A1 | 9/2004 | Caldwell | EP | 1028398 | 8/2000 |
| 2004/0193893 A1 | 9/2004 | Braithwaite et al. | EP | 1041506 | 10/2000 |
| 2004/0204711 A1 | 10/2004 | Jackson | EP | 1041523 | 10/2000 |
| 2004/0219902 A1 | 11/2004 | Lee et al. | EP | 1126403 | 8/2001 |
| 2004/0233038 A1 | 11/2004 | Beenau et al. | EP | 1139270 | 10/2001 |
| 2004/0252866 A1 | 12/2004 | Tisse et al. | EP | 1237117 | 9/2002 |
| 2004/0255168 A1 | 12/2004 | Murashita et al. | EP | 1477925 | 11/2004 |
| 2005/0008200 A1 | 1/2005 | Azuma et al. | EP | 1635307 | 3/2006 |
| 2005/0008201 A1 | 1/2005 | Lee et al. | GB | 2369205 | 5/2002 |
| 2005/0012817 A1 | 1/2005 | Hampapur et al. | GB | 2371396 | 7/2002 |
| 2005/0029353 A1 | 2/2005 | Isemura et al. | GB | 2375913 | 11/2002 |
| 2005/0052566 A1 | 3/2005 | Kato | GB | 2402840 | 12/2004 |
| 2005/0055582 A1 | 3/2005 | Bazakos et al. | GB | 2411980 | 9/2005 |
| 2005/0063567 A1 | 3/2005 | Saitoh et al. | JP | 9161135 | 6/1997 |
| 2005/0084137 A1 | 4/2005 | Kim et al. | JP | 9198545 | 7/1997 |
| 2005/0084179 A1 | 4/2005 | Hanna et al. | JP | 9201348 | 8/1997 |
| 2005/0099288 A1 | 5/2005 | Spitz et al. | JP | 9147233 | 9/1997 |
| 2005/0102502 A1 | 5/2005 | Sagen | JP | 9234264 | 9/1997 |
| 2005/0110610 A1 | 5/2005 | Bazakos et al. | JP | 9305765 | 11/1997 |
| 2005/0125258 A1 | 6/2005 | Yellin et al. | JP | 9319927 | 12/1997 |
| 2005/0127161 A1 | 6/2005 | Smith et al. | JP | 10021392 | 1/1998 |
| 2005/0129286 A1 | 6/2005 | Hekimian | JP | 10040386 | 2/1998 |
| 2005/0134796 A1 | 6/2005 | Zelvin et al. | JP | 10049728 | 2/1998 |
| 2005/0138385 A1 | 6/2005 | Friedli et al. | JP | 10137219 | 5/1998 |
| 2005/0138387 A1 | 6/2005 | Lam et al. | JP | 10137221 | 5/1998 |
| 2005/0146640 A1 | 7/2005 | Shibata | JP | 10137222 | 5/1998 |
| 2005/0151620 A1 | 7/2005 | Neumann | JP | 10137223 | 5/1998 |
| 2005/0152583 A1 | 7/2005 | Kondo et al. | JP | 10248827 | 9/1998 |
| 2005/0193212 A1 | 9/2005 | Yuhara | JP | 10269183 | 10/1998 |
| 2005/0199708 A1 | 9/2005 | Friedman | JP | 11047117 | 2/1999 |
| 2005/0206501 A1 | 9/2005 | Farhat | JP | 11089820 | 4/1999 |
| 2005/0206502 A1 | 9/2005 | Bernitz | JP | 11200684 | 7/1999 |
| 2005/0207614 A1 | 9/2005 | Schonberg et al. | JP | 11203478 | 7/1999 |
| 2005/0210267 A1 | 9/2005 | Sugano et al. | JP | 11213047 | 8/1999 |
| 2005/0210270 A1 | 9/2005 | Rohatgi et al. | JP | 11339037 | 12/1999 |
| 2005/0210271 A1 | 9/2005 | Chou et al. | JP | 2000005149 | 1/2000 |
| 2005/0238214 A1 | 10/2005 | Matsuda et al. | JP | 2000005150 | 1/2000 |
| 2005/0240778 A1 | 10/2005 | Saito | JP | 2000011163 | 1/2000 |
| 2005/0248725 A1 | 11/2005 | Ikoma et al. | JP | 2000023946 | 1/2000 |
| 2005/0249385 A1 | 11/2005 | Kondo et al. | JP | 2000083930 | 3/2000 |
| 2005/0255840 A1 | 11/2005 | Markham | JP | 2000102510 | 4/2000 |
| 2006/0093190 A1 | 5/2006 | Cheng et al. | JP | 2000102524 | 4/2000 |
| 2006/0147094 A1* | 7/2006 | Yoo ............................... 382/117 | JP | 2000105830 | 4/2000 |
| 2006/0165266 A1 | 7/2006 | Hamza | JP | 2000107156 | 4/2000 |
| 2006/0274919 A1 | 12/2006 | LoIacono et al. | JP | 2000139878 | 5/2000 |
| 2007/0036397 A1 | 2/2007 | Hamza | JP | 2000155863 | 6/2000 |
| 2007/0140531 A1 | 6/2007 | Hamza | JP | 2000182050 | 6/2000 |
| 2007/0160266 A1 | 7/2007 | Jones et al. | JP | 2000185031 | 7/2000 |
| 2007/0189582 A1 | 8/2007 | Hamza et al. | JP | 2000194972 | 7/2000 |
| 2007/0206840 A1 | 9/2007 | Jacobson | JP | 2000237167 | 9/2000 |
| 2007/0211924 A1 | 9/2007 | Hamza | JP | 2000242788 | 9/2000 |
| 2007/0274571 A1 | 11/2007 | Hamza | JP | 2000259817 | 9/2000 |
| 2007/0286590 A1 | 12/2007 | Terashima | JP | 2000356059 | 12/2000 |
| 2008/0005578 A1 | 1/2008 | Shafir | JP | 2000357232 | 12/2000 |
| 2008/0075334 A1 | 3/2008 | Determan et al. | JP | 2001005948 | 1/2001 |
| 2008/0075441 A1 | 3/2008 | Jelinek et al. | JP | 2001067399 | 3/2001 |
| 2008/0104415 A1 | 5/2008 | Palti-Wasserman et al. | JP | 2001101429 | 4/2001 |
| 2008/0148030 A1 | 6/2008 | Goffin | JP | 2001167275 | 6/2001 |
| 2008/0211347 A1 | 9/2008 | Wright et al. | JP | 2001222661 | 8/2001 |
| 2008/0252412 A1 | 10/2008 | Larsson et al. | JP | 2001292981 | 10/2001 |
| 2008/0267456 A1 | 10/2008 | Anderson | JP | 2001297177 | 10/2001 |
| 2009/0046899 A1 | 2/2009 | Northcott et al. | JP | 2001358987 | 12/2001 |
| 2009/0092283 A1 | 4/2009 | Whillock et al. | JP | 2002119477 | 4/2002 |
| 2009/0316993 A1 | 12/2009 | Brasnett et al. | JP | 2002133415 | 5/2002 |
| 2010/0002913 A1 | 1/2010 | Hamza | JP | 2002153444 | 5/2002 |
| 2010/0033677 A1 | 2/2010 | Jelinek | JP | 2002153445 | 5/2002 |
| 2010/0034529 A1 | 2/2010 | Jelinek | JP | 2002260071 | 9/2002 |
| 2010/0142765 A1 | 6/2010 | Hamza | JP | 2002271689 | 9/2002 |
| 2010/0182440 A1 | 7/2010 | McCloskey | JP | 2002286650 | 10/2002 |
| 2010/0239119 A1 | 9/2010 | Bazakos et al. | JP | 2002312772 | 10/2002 |
| | | | JP | 2002329204 | 11/2002 |
| | FOREIGN PATENT DOCUMENTS | | JP | 2003006628 | 1/2003 |
| EP | 0593386 | 4/1994 | JP | 2003036434 | 2/2003 |
| EP | 0878780 | 11/1998 | JP | 2003108720 | 4/2003 |
| EP | 0899680 | 3/1999 | JP | 2003108983 | 4/2003 |
| EP | 0910986 | 4/1999 | JP | 2003132355 | 5/2003 |

| | | |
|---|---|---|
| JP | 2003150942 | 5/2003 |
| JP | 2003153880 | 5/2003 |
| JP | 2003242125 | 8/2003 |
| JP | 2003271565 | 9/2003 |
| JP | 2003271940 | 9/2003 |
| JP | 2003308522 | 10/2003 |
| JP | 2003308523 | 10/2003 |
| JP | 2003317102 | 11/2003 |
| JP | 2003331265 | 11/2003 |
| JP | 2004005167 | 1/2004 |
| JP | 2004021406 | 1/2004 |
| JP | 2004030334 | 1/2004 |
| JP | 2004038305 | 2/2004 |
| JP | 2004094575 | 3/2004 |
| JP | 2004152046 | 5/2004 |
| JP | 2004163356 | 6/2004 |
| JP | 2004164483 | 6/2004 |
| JP | 2004171350 | 6/2004 |
| JP | 2004171602 | 6/2004 |
| JP | 2004206444 | 7/2004 |
| JP | 2004220376 | 8/2004 |
| JP | 2004261515 | 9/2004 |
| JP | 2004280221 | 10/2004 |
| JP | 2004280547 | 10/2004 |
| JP | 2004287621 | 10/2004 |
| JP | 2004315127 | 11/2004 |
| JP | 2004318248 | 11/2004 |
| JP | 2005004524 | 1/2005 |
| JP | 2005011207 | 1/2005 |
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| JP | 2005242677 | 9/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | WO 00/62239 | 10/2000 |
| WO | WO 01/01329 | 1/2001 |
| WO | WO 01/03100 | 1/2001 |
| WO | WO 01/28476 | 4/2001 |
| WO | WO 01/35348 | 5/2001 |
| WO | WO 01/35349 | 5/2001 |
| WO | WO 01/40982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/19030 | 3/2002 |
| WO | WO 02/35452 | 5/2002 |
| WO | WO 02/35480 | 5/2002 |
| WO | WO 02/091735 | 11/2002 |
| WO | WO 02/095657 | 11/2002 |
| WO | WO 03/002387 | 1/2003 |
| WO | WO 03/003910 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/012645 | 2/2006 |
| WO | WO 2006/023046 | 3/2006 |
| WO | WO 2006/051462 | 5/2006 |
| WO | WO 2006/063076 | 6/2006 |
| WO | 2006081505 | 8/2006 |
| WO | WO 2006/081209 | 8/2006 |
| WO | WO 2007/101269 | 9/2007 |
| WO | WO 2007/101275 | 9/2007 |
| WO | WO 2007/101276 | 9/2007 |
| WO | WO 2007/103698 | 9/2007 |
| WO | WO 2007/103701 | 9/2007 |
| WO | WO 2007/103833 | 9/2007 |
| WO | WO 2007/103834 | 9/2007 |
| WO | WO 2008/016724 | 2/2008 |
| WO | WO 2008/019168 | 2/2008 |
| WO | WO 2008/019169 | 2/2008 |
| WO | WO 2008/021584 | 2/2008 |
| WO | WO 2008/031089 | 3/2008 |
| WO | WO 2008/040026 | 4/2008 |

OTHER PUBLICATIONS

Gan et al., "Applications of Wavelet Packets Decomposition in Iris Recognition," LNCS 3832, pp. 443-449, 2005.
Wei et al., "Robust and Fast Assessment of Iris Image Quality," LNCS 3832, pp. 464-471, 2005.
Li zhi-hui et al., "Research Iris Serial Images Quality Assessment Method Based on HVS," Optical Design and Fabrication, Proceedings of SPIE, vol. 6034, 60341T, 2006.
Avcibas et al., "Steganalysis Using Image Quality Metrics," IEEE Transactions on Image Processing, vol. 12, No. 2, pp. 221-229, Feb. 2003.
Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.
Carson et al., "Blobworld: Image Segmentation Using Expectation-Maximization and its Application to Image Querying," IEEE Transactions on Pattern Analysis and Machine Intelligence, vol. 24, No. 8, pp. 1026-1038, Aug. 2002.
Daugman, "How Iris Recognition Works," IEEE 2002 International Conference on Image Processing, vol. I of III, 6 pages, Sep. 22-25, 2002.
Guo et al., "A System for Automatic Iris Capturing," Mitsubishi Electric Research Laboratories, Inc., 10 pages, 2005.
Guo, "Face, Expression, and Iris Recognition Using Learning-Based Approaches," 132 pages, 2006.
Jalaja et al., "Texture Element Feature Characterizations for CBIR," IEEE, pp. 733-736, 2005.
Kalka et al., "Image Quality Assessment for Iris Biometric," Proc. of SPIE vol. 6202 62020D, 11 pages, 2006.
Ko et al., "Monitoring and Reporting of Fingerprint Image Quality and Match Accuracy for a Large User Application," IEEE Computer Society, Proceedings of the 33rd Applied Imagery Pattern Recognition Workshop, 6 pages, 2004.
Lau et al., "Finding a Small Number of Regions in an Image Using Low-Level Features," Pattern Recognition 35, pp. 2323-2339, 2002.
Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.
Oppenheim et al, "The Importance of Phase in Signals," Proceedings of the IEEE, vol. 69, No. 5, pp. 529-541, 1981.
Ratha et al., "A Real-Time Matching System for Large Fingerprint Databases," IEEE Transactions on Pattern Analysis, and Machine Intelligence, vol. 18, No. 8, pp. 799-812, Aug. 1996.
Sony, "Network Color Camera, SNC-RZ3ON (NTSC)," 6 pages, Aug. 2002.

Wang et al, "Image Quality Assessment: From Error Visibility to Structural Similarity," IEEE Transactions on Image Processing, vol. 13, No. 4, pp. 600-612, Apr. 2004.

Wang et al., "A Universal Image Quality Index," IEEE Signal Processing Letters, vol. 9, No. 3, pp. 81-84, Mar. 2002.

Wang et al., "Local Phase Coherence and the Perception of Blur," Advances in Nueral Information Processing Systems 16, pp. 1435-1442, 2004.

Bonney et al., "Iris Pattern Extraction Using Bit Planes and Standard Deviations," IEEE, pp. 582-586, 2004.

Camus et al., "Reliable and Fast Eye Finding in Close-up Images," IEEE, pp. 389-394, 2002.

Cui et al., "A Fast and Robust Iris Localization Method Based on Texture Segmentation," 8 pages, 2004.

Cui et al., "An Appearance-Based Method for Iris Detection," 6 pages, 2004.

Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.

Cui et al., "An Iris Image Synthesis Method Based on PCA and Super-Resolution," IEEE Computer Society, Proceedings of the 17th International Conference on Pattern Recognition, 6 pages, Aug. 23-26, 2004.

Cui et al., "An Iris Recognition Algorithm Using Local Extreme Points," Biometric Authentication, First International Conference, ICBA 2004, Hong Kong, China, 10 pages, Jul. 15-17, 2004.

Daugman, "Results From 200 Billion Iris Cross-Comparisons," University of Cambridge Computer Laboratory, Technical Report, No. 635, 8 pages, Jun. 2005.

Du et al., "A One-Dimensional Approach for Iris Identification," 11 pages, prior to Jan. 25, 2006.

http://www.newscientisttech.com/article/dn11110-invention-covert-iris-sc, "Invention: Covert Iris Scanner," 3 pages, printed Feb. 8, 2007.

Huang et al., "Iris Model Based on Local Orientation Description," 5 pages, prior to Jan. 25, 2006.

Huang et al., "An Efficient Iris Recognition System," IEEE Proceedings of the First International Conference on Machine Learning and Cybernetics, Beijing, pp. 450-454, Nov. 4-5, 2002.

Ma et al., "Personal Identification Based on Iris Texture Analysis," IEEE Transactions on Pattern Analysis and Machine Intelligence, vol. 25, No. 12, pp. 1519-1533, Dec. 2003.

Masek, "Recognition of Human Iris Patterns for Biometric Identification," 61 pages, 2003.

Sun et al., "Robust Encoding of Local Ordinal Measures: A General Framework of Iris Recognition," 13 pages, prior to Jan. 25, 2006.

AOptix Technologies, "Introducing the AOptix InSight 2 Meter Iris Recognition System," 6 pages, 2010.

Belhumeur et al., "Eigenfaces Vs. Fisherfaces: Recognition Using Class Specific Linear Projection," 14 pages, prior to Jun. 11, 2010.

Bentley et al., "Multidimensional Binary Search Trees Used for Associative Searching," Communications of the ACM, vol. 18, No. 9, pp. 509-517, Sep. 1975.

Blackman et al., "Chapter 9, Multiple Sensor Tracking: Issues and Methods," Design and Analysis of Modern Tracking Systems, Artech House, pp. 595-659, 1999.

Brasnett et al., "A Robust Visual Identifier Using the Trace Transform," 6 pages, prior to Jun. 11, 2010.

Buades et al., "A Review of Image Denoising Algorithms, with a New One," Multiscale Modeling & Simulation, vol. 4, No. 2, pp. 490-530, 2005.

Chow et al., "Towards a System for Automatic Facial Feature Detection," Pattern Recognition vol. 26, No. 12, pp. 1739-1755, 1993.

U.S. Appl. No. 12/792,498, filed Jun. 2, 2010.

U.S. Appl. No. 12/814,232, filed Jun. 11, 2010.

U.S. Appl. No. 12/814,272, filed Jun. 11, 2010.

Cula et al., "Bidirectional Imaging and Modeling of Skin Texture," Proceedings of Texture 2003, 6 pages, Oct. 17, 2003.

Cula et al., "Bidirectional Imaging and Modeling of Skin Texture," IEEE Transactions on Biomedical Engineering, vol. 51, No. 12, pp. 2148-2159, 2004.

Cula et al., "Compact Representation of Bidirectional Texture Functions," Proceedings of IEEE Computer Society Conference on Computer Vision and Pattern Recognition 2001, 8 pages, 2001.

Cula et al., "Skin Texture Modeling," International Journal of Computer Vision 2004, 34 pages, 2004.

Dabov et al., "Image Denoising by Sparse 3-D Transform-Domain Collaborative Filtering," IEEE Transactions on Image Processing, vol. 16, No. 8, pp. 2080-2095, Aug. 2007.

Dabov et al., "Image Restoration by Spars 3D Transform Collaborative Filtering," SPIE vol. 6812 681207-1, 12 pages, 2008.

Daugman, "High Confidence Visual Recognition of Persons by a Test of Statistical Independence," IEEE Transactions on Pattern Analysis and Machine Intelligence, vol. 15, No. 11, pp. 1148-1161, 1993.

Daugman, "Probing the Uniqueness and Randomness of Iris Codes: Results from 200 Billion Iris Pair Compsarisons," Proceedings of the IEEE vol. 94, No. 11, pp. 1928-1935, Nov. 2006.

Fooprateepsiri et al., "A Highly Robust Method for Face Authentication," IEEE 2009 First Asian Conference on Intelligent Information and Database Systems, pp. 380-385, 2009.

Fooprateepsiri et al., "Face Verification Base-On Hausdorff-Shape Context," IEEE 2009 Asia Conference on Informatics in Control, Automation and Robotics, pp. 240-244, 2009.

Forstner et al., "A Metric for Covariance Matrices," 16 pages, prior to Jun. 11, 2010.

Hampapur et al., "Smart Surveillance: Applications, Technologies and Implications," IEEE, 6 pages, Dec. 15-18, 2003.

Hamza et al., "Standoff Iris Recognition Usin Non-Iterative Polar Based Segmentation," Proceedings of SPIE vol. 6944, 8 pages, 2008.

Hanna et al., "A System for Non-Intrusive Human Iris Acquisition and Identification," IAPR Workshop on Machine Vision Application, pp. 200-203, Nov. 12-14, 1996.

http://en.wikipedia.org/wiki/Radon_transform, "Radon Transform," 5 pages, printed May 14, 2010.

Ivins et al., "A Deformable Model of the Human Iris for Measuring Small Three-Dimensional Eye Movements," Machine Vision and Applications, vol. 11, pp. 42-51, 1998.

Kadyrov et al., "The Trace Transform and its Applications," IEEE Transactions on Pattern Analysis and Machine Intelligence, vol. 23, No. 8, pp. 811-828, Aug. 2001.

Kadyrov et al., "The Trace Transform as a Tool to Invariant Feature Construction," 3 pages, prior to Jun. 11, 2010.

Kang et al., "Improved Dual Action Contour for Iris Recognition," 10 pages, prior to Jun. 11, 2010.

Kawaguchi et al., "Detection of Eyes from Human Faces by Hough Transform and Separability Filter," IEEE, 4 pages, 2000.

Kong et al., "Detecting Eyelash and Reflection for Accurate Iris Segmentation," International Journal of Pattern Recognition and Artificial Intelligence, vol. 17, No. 6, pp. 1025-1034, 2003.

Li et al., "Appearance Modeling Using a Geometric Transform," IEEE Transactions on Image Processing, 17 pages, 2008.

Li et al., "Appearance Modeling Using a Geometric Transform," Journal Preparation for IEEE Transactions on Image Processing, 30 pages, Nov. 5, 2006.

Ma et al., "Local Intensity Variation Analysis for Iris Recognition," Pattern Recognition, vol. 37, pp. 1287-1298, 2004.

Ma et al., "Video Sequence Querying Using Clustering of Objects' Appearance Models," Advances in Visual Computing Third Annual Symposium, ISVC 2007, 14 pages, 2007.

Monro et al., "DCT-Based Iris Recognition," IEEE Transactions on Pattern Analysis and Machine Intelligence, vol. 29, No. 4, Apr. 2007.

Noh et al., "A Novel Method to Extract Features for Iris Recognition System," AVBPA 2003, LNCS 2688, pp. 862-868, 2003.

Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.

Pamudurthy et al., "Dynamic Approach for Face Recognition Using Digital Image Skin Correlation," Audio and Video Based Person Authentication 5th International Conference, AVBPA 2005, Hilton Rye Town, NY, USA, 11 pages, Jul. 20-22, 2005.

Petrou et al., "The Trace Transform in a Nutshell," 9 pages, prior to Jun. 11, 2010.

Phillips et al., "FRVT 2006 and ICE 2006 Large-Scale Results," 56 pages, Mar. 2007.

Porikli et al., "Covariance Tracking Using Model Update Based on Means on Riemannian Manifolds," 8 pages prior to Jun. 11, 2010.

Proenca et al., "Toward Noncooperative Iris Recognition: A Classification Approach Using Multiple Signatures," IEEE Transactions on Pattern Analysis and Machine Intellingence, vol. 29, No. 4, pp. 607-612, Apr. 2007.

Ross et al., "Segmenting Non-Ideal Irises Using Geodesic Active Contours," IEEE 2006 Biometrics Symposium, 3 pages, 2006.

Shapiro et al., pp. 556-559 in Book Entitled "Computer Vision," Prentice Hall, prior to Jun. 11, 2010.

Stillman et al., "A System for Tracking and Recognizing Multiple People with Multiple Cameras," 6 pages, Aug. 1998.

Sun Et al., "Iris Recognition Based on Non-local Comparisons," Sinobiometrics 2004, LNCS 3338, pp. 67-77, 2004.

Suzaki et al., "A Horse Identification System Using Biometrics," Systems and Computer in Japan, vol. 32, No. 14, pp. 12-23, 2001.

Trucco et al., "Robust Iris Location in Close-up Images of the Eye," Pattern Anal. Applic. vol. 8, pp. 247-255, 2005.

Turan et al., "Trace Transform Based Invariant Object Recognition System," 4 pages, prior to Jun. 11, 2010.

Turk et al., "Eigenfaces for Recognition," Journal of Cognitive Neuroscience, vol. 3, No. 1, 16 pages, 1991.

Wang et al., "Recent Developments in Human Motion Analysis," Pattern Recognition, vol. 36, pp. 585-601, 2003.

Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.

U.S. Appl. No. 13/077,821 filed Mar. 30, 2011.

Freeboy, "Adaptive Optics Speeds Up Airport Immigration," Optics.org/ole, 2 pages, Jan. 2009.

http://www.imagine-eyes.com/content/view/100/115/, "INOVEO—Ultra-High Resolution Retinal Imaging with Adaptive Optics," 2 pages, printed Feb. 22, 2010.

* cited by examiner

IRIS RECOGNITION SYSTEM HAVING IMAGE QUALITY METRICS

This application claims the benefit of U.S. Provisional Application No. 60/778,770, filed Mar. 3, 2006.

This application is a continuation-in-part of U.S. patent application Ser. No. 11/275,703, filed Jan. 25, 2006, which claims the benefit of U.S. Provisional Application No. 60/647,270, filed Jan. 26, 2005.

This application is a continuation-in-part of U.S. patent application Ser. No. 11/043,366, filed Jan. 26, 2005.

This application is a continuation-in-part of U.S. patent application Ser. No. 11/372,854, filed Mar. 10, 2006;

This application is a continuation-in-part of U.S. patent application Ser. No. 11/672,108, filed Feb. 7, 2007.

This application is a continuation-in-part of U.S. patent application Ser. No. 11/675,424, filed Feb. 15, 2007.

The government may have rights in the present invention.

BACKGROUND

The present invention pertains to recognition systems and particularly to biometric recognition systems. More particularly, the invention pertains to iris recognition systems.

Related applications may include U.S. patent application Ser. No. 10/979,129, filed Nov. 3, 2004, which is a continuation-in-part of U.S. patent application Ser. No. 10/655,124, filed Sep. 5, 2003; and U.S. patent application Ser. No. 11/382,373, filed May 9, 2006, which are hereby incorporated by reference.

U.S. Provisional Application No. 60/778,770, filed Mar. 3, 2006, is hereby incorporated by reference.

U.S. patent application Ser. No. 11/275,703, filed Jan. 25, 2006, is hereby incorporated by reference.

U.S. Provisional Application No. 60/647,270, filed Jan. 26, 2005, is hereby incorporated by reference.

U.S. patent application Ser. No. 11/043,366, filed Jan. 26, 2005, is hereby incorporated by reference.

U.S. patent application Ser. No. 11/372,854, filed Mar. 10, 2006, is hereby incorporated by reference.

U.S. patent application Ser. No. 11/672,108, filed Feb. 7, 2007, is hereby incorporated by reference.

U.S. patent application Ser. No. 11/675,424, filed Feb. 15, 2007 is hereby incorporated by reference.

SUMMARY

The present invention is an iris recognition system implementing image quality metrics to assess the quality of the acquired eye image for reliable operation. Images with low image quality may be rejected or flagged based upon the application.

DESCRIPTION

The present system may relate to biometrics, iris recognition systems, image quality metrics, authentication, access control, monitoring, identification, and security and surveillance systems. The present system addresses specifically a preprocessing procedure that may be included prior to executing the iris recognition techniques.

Figure 1:
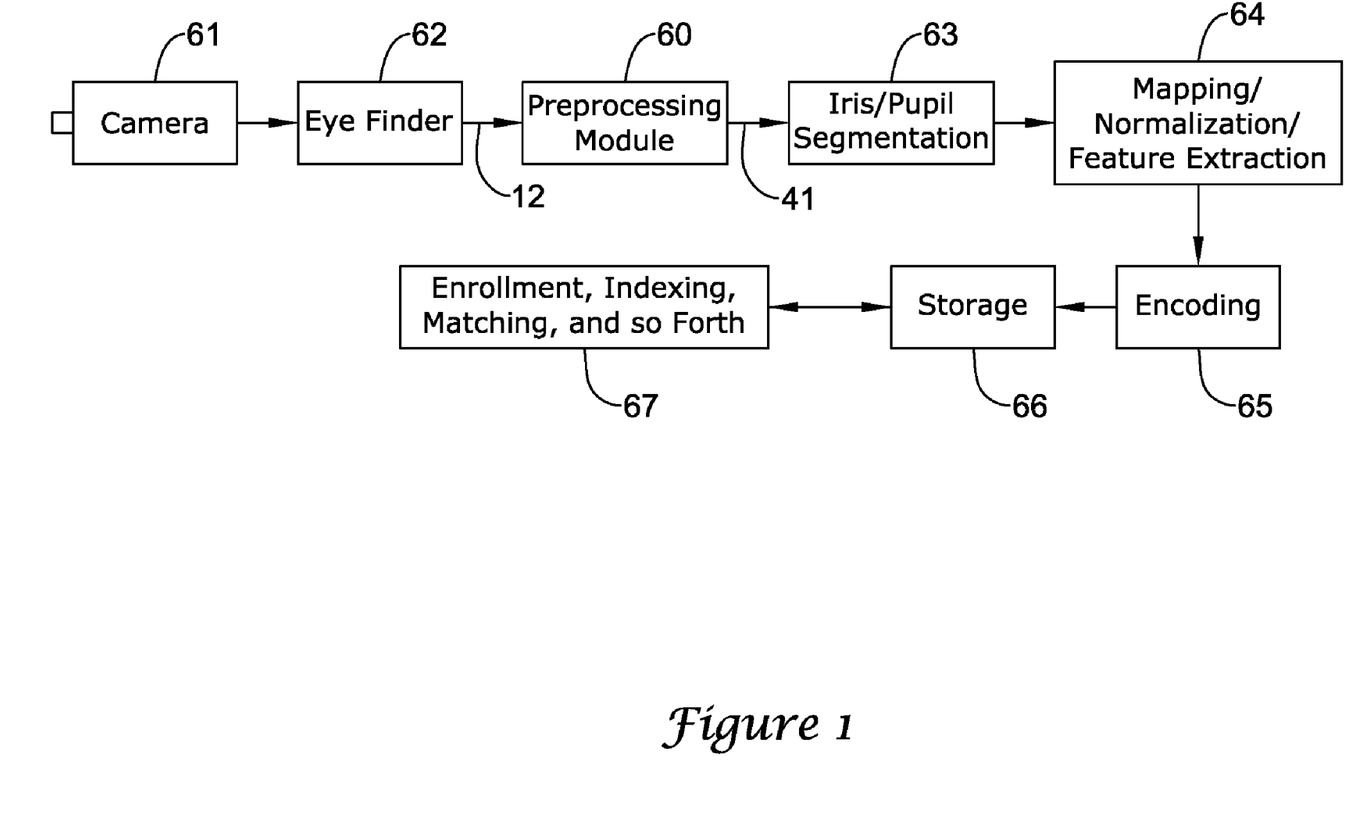
FIG. 1 is a diagram of an overall iris recognition system incorporating a preprocessing module for image quality metrics.

An overall eye detection system is shown in FIG. 1. It shows a camera 61 that may provide an image with a face in it to the eye finder 62 as noted herein. The eyefinder 62 may provide an image of one or two eyes that goes to a preprocessing module 60 for iris image evaluation and possible rehabilitation if needed. If the iris image does not meet a set of quality metrics and cannot be rehabilitated, then the eye image is rejected and a new eye image capture may be sought by eyefinder 62. In another embodiment, if the iris image does not meet a set of quality metrics, then the eye image may be flagged and the processing thereafter configured based upon the image quality assessment. If the iris image satisfies the set of quality metrics, either as it is captured or rehabilitated, then the image may be forwarded to the iris segmentation block 63. A one dimensional polar segmentation (1D POSE) system in block 63 may be used to perform the segmentation. POSE may be based on the assumption that image (e.g., 320×240 pixels) has a visible pupil where iris can be partially visible. POSE can still operate on not fully visible pupil where little portions of the pupil are obscured by the eyelids. There may be pupil segmentation at the inner border between the iris and pupil and segmentation at the outer border between the iris and the sclera and iris and eyelids. An output having a segmented image may go to a block 64 for mapping/normalization and feature extraction. An output from block 64 may go to an encoding block 65 which may provide an output, such as a barcode of the images to block 65 put in terms of ones and zeros. The coding of the images may provide a basis for storage in block 66 of the eye information which may be used for enrolling, indexing, matching, and so on, at block 67, of the eye information, such as that of the iris and pupil, related to the eye.

The present system may assess the quality of an eye image in real-time as a quality control procedure. This approach may allow poor image acquisition to be corrected through recapture and facilitate the acquisition of a best possible image within the capture time window configured in the system. This acquisition may result in a process for providing more good quality iris images that can improve the iris identification accuracy and the integrity of iris recognition systems.

An objective of the present invention is to define rules to assess iris image quality and use these rules as discriminators for covering poor qualities of iris images or reconfiguring the processing steps based upon the image quality assessment. With a person in the loop, it may be somewhat straightforward to ultimately assess the quality the eye image using subjective evaluation. In practice, however, subjective evaluation may lead to errors and thus tend to be impractical in view of the presently developed automated iris recognition systems. In addition, what is perceived as a good quality to the human eye does not necessary secure a reliable recognition by the present processes. Thus, the image quality may be assessed based upon specific criteria critical to a successful iris recognition processing. Like the fingerprint biometrics, iris recognition systems may have widely varying matching performance factors which depend heavily on eye image quality. The iris pattern and eye pose may have a direct effect on matcher accuracy. Therefore, operational recognition systems may require effective iris image quality metrics for image assessment even as the iris pattern is analyzed.

An automated iris recognition system may have major components which include iris localization, iris map feature extraction, encoding, and enroll/matching. In image acquisition, a digital image capturing the eye may be obtained at multiple resolutions, eye orientation and transition, under variant lighting illumination and in a noise laden environment. The feature extraction process may capture the unique texture of the iris pattern, and the encoder may encode the information into an iris barcode to expedite a matching process. The matching may involve computing a number of bits matched in the iris barcode against multiple templates of barcodes in a database. The performance of such a system may depend heavily on the various stages of the iris recognition processes, and in turn each of these processes may depend on the quality of the captured iris image. An objective image quality metric can play a variety of roles in each of the iris processing stages. Many artifacts may affect one or more of these processes.

A perfectly captured iris pattern under ideal conditions may illustrate clearly the texture of an iris that can be captured in a unique iris barcode. However, many factors such as eye closure, obscuration, an off-angle eye, occlusions, imperfect acquisition embedded in electronic noise, non-uniform illumination, different sensor wavelength sensitivity, pupil dilation, and specular light reflection may cause the captured iris map to be far from having ideal quality. Smearing, blurring, defocus (corresponding iris textures are at different depths in the acquisition scene) and poor resolution may result in the capture of very poor quality images as well as have a negative impact on iris segmentation and/or feature extraction and encoding.

Here, one may define a common framework to assess the quality of an image, develop quantitative measures that can objectively and automatically assess the quality or condition of the iris image before being processed for iris recognition, and preprocess the image for quality improvement.

Digital eye images may be subject to a wide variety of distortions during acquisitions, transmission and reproduction, any of which may result in degradation of iris recognition performance. To counter such vulnerability, the present system may have quantitative measures that can automatically assess the quality of iris images before being processed for iris recognition, and develop an appropriate set of quantitative iris image quality metrics (IIQMs). The present system may include apparatus and approaches for implementation of an appropriate set of quantitative iris image quality metrics (IIQMs). The IIQMs may be defined relative to image features based on acquisition performance. The quality of the image should correlate well with subjective iris processes. The IIQMs may be integrated into the preprocessing procedure to assess the quality of the iris image before the iris recognition process is initiated. Based upon an evaluation with these metrics, one may accept the input image, reconfigure the processing to deal with degradations, or request a new capture of the iris.

One may note various iris image quality metrics. Metrics to support automatic iris quality measurement may include eyelash/eyelid occlusion, pupil dilation, illumination, SNR, motion blur, optical defocusing, sensor noise, specular reflection, pixel count, iris texture sharpness, and so on.

There may be an interest in the modeling of image sharpness for the purpose of improving the performance of image analysis. Image quality metrics appear to be a reliable general purpose tool for iris image assessment before running an iris recognition process. To that end, a set of criteria may be defined for use with iris image quality metrics. A first criterion involves blur which may be measured using high frequency distortions from coarse to fine wavelet coefficients, or XOR-ing the resulting codes of two patches of same iris to measure discrepancy among the bits. Blur may be related to defocus. A second criterion involves defocus which may be assessed by measuring high frequency within the iris map. A third criterion involves eye closure which may be assessed using the iris inner border profile. A fourth criterion involves iris obscuration which may be assessed by computing the integral of the area between the eyelid curve and iris inner boundary. A fifth criterion involves off-angle eye (i.e., gazed eye) detection which may be assessed in the iris outer boundary shape fitting. A sixth criterion involves reflection which may be assessed using iris curve fitting and high contrast thresholding. A seventh criterion may involve excessive pupil extreme dilation which may be determined by evaluating the limits of the pupil edge detection.

Figure 2:
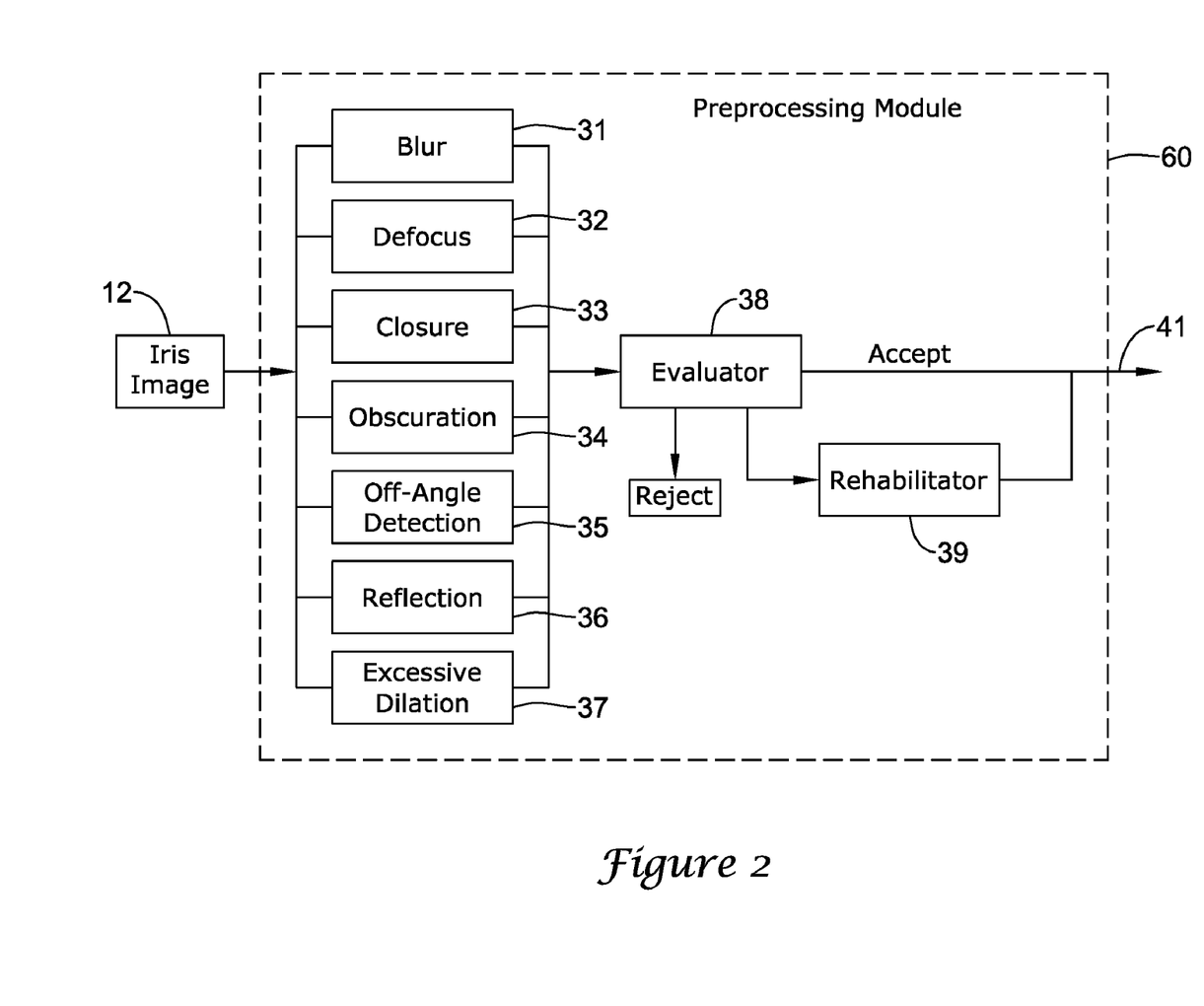
FIG. 2 is a diagram of the preprocessing module for image quality metrics.

FIG. 2 is a diagram of the preprocessing module 60 of FIG. 1. An iris image may enter module 60 and go to measurement modules such as blur module 31, defocus module 32, closure module 33, obscuration module 34, off-angle detection module 35, reflection module 36 and excessive dilation module 37. The measurement outputs of these modules may go to an evaluator 38 which may determine, according to the received measurements, whether the iris image 12 is acceptable as an output 41 for further processing such as segmentation. If the image 12 is not acceptable, it may be rejected or be deemed to have discrepancies that are reparable. If the latter is the case, then the image 12 may go to a rehabilator 39 for conditioning to make the image 12 as an output 41 acceptable for further processing or reconfiguring some of the processing to deal with the inherited degradations.

Objective image quality metrics may be classified according to the availability of a non-affected image, with which the distorted image is to be compared. One may note that iris image 12 quality enhancement may include pixel processing, contrast balancing, histogram equalization, image restoration, image blind deblurring, adaptive filtering for iris texture restoration, and pose normalization.

Figure 3A:
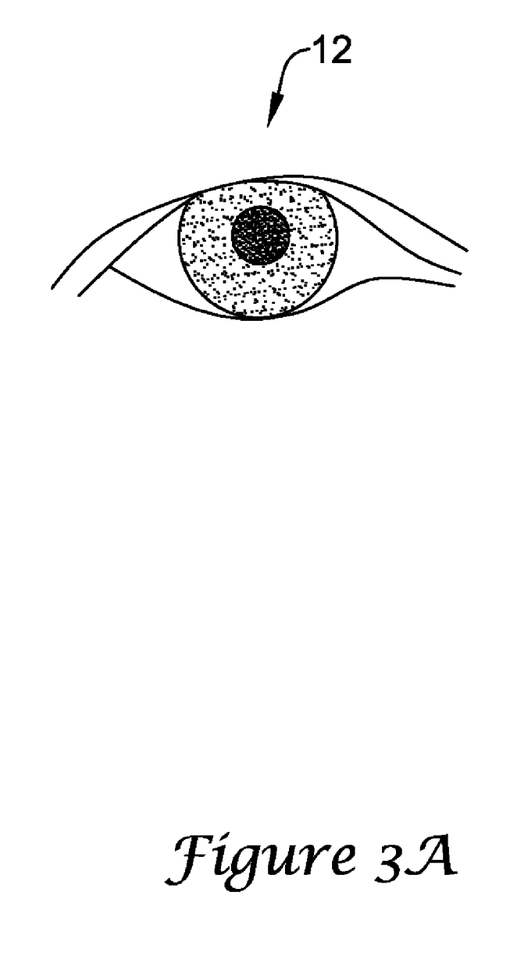
FIGS. 3a, 3b and 3c show an ordinary eye image, a blurred eye image and a restored blurred eye image, respectively.
Figure 3B:
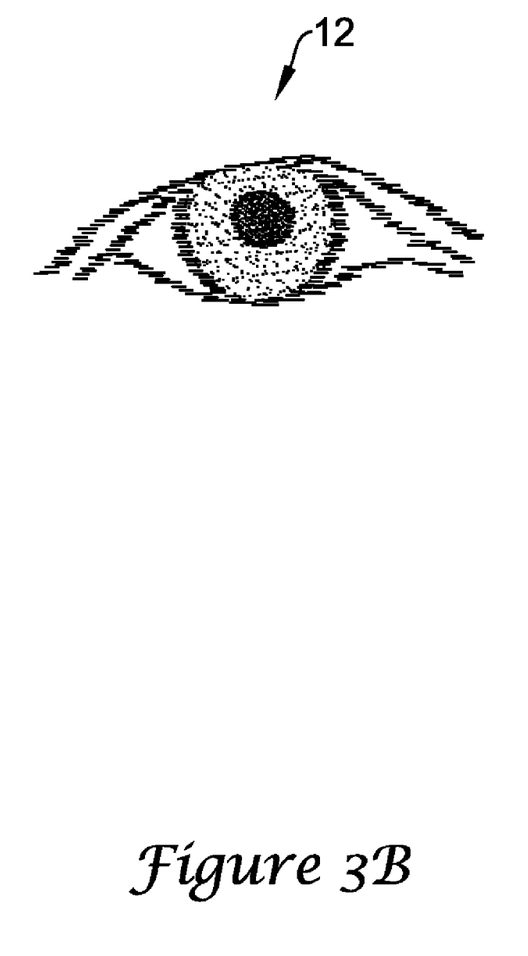
Figure 3C:
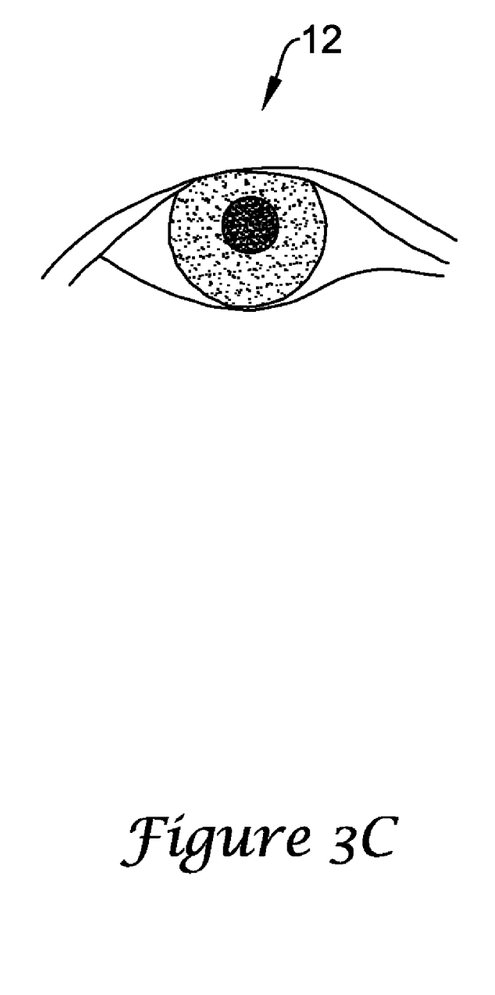

FIGS. 3a, 3b and 3c show an example of conditioning of an iris image 12 by rehabilator 39. FIG. 3a is a good image 12 of the eye or iris. FIG. 3b is a blurred image 12. FIG. 3c is conditioned or rehabilitated image 12 of the eye or iris. Various kinds of techniques may be used for rehabilitative processing. Knowing a cause of the blurring may provide a basis for taking the blur out of the image 12, by perhaps reversing the cause of the blurring via processing, to result in a good image for further processing such as segmentation.

Blurring may be one of the most common forms of image distortion which can affect dramatically the performance of iris recognition. Experience may show that the effect of blurring is mostly apparent on the iris map feature extractions and encoding of the iris. The iris segmentation procedure may often be unaffected due to an existence of sufficient contrast among the iris and sclera or pupil that still permits a segmentation of the iris. The blurring phenomenon may be explained as a reduction in energy at high frequencies of the spectral domain of the image. Blurring of the iris image may occur in many different forms. The optical defocus, subject motion, and camera displacement for zooming may introduce blur distortions, which are a direct result of some technical limitation during eye acquisition.

Relative to motion blur and smearing effects, one may base a solution on high frequency distortions among the coarse to fine wavelet coefficients to detect blur by comparing the linear frequency distortion filter outputs at multiple stages of a dyadic decomposition to measure the discrepancy among the stages. An objective may be to automate these detection procedures as blurring has been proven to affect the iris matching performance. Detection of blur requires some modeling of what constitutes a blurred image and unaffected image. A hypothesis may be that image smearing leaves statistical evidence which can be exploited for detection with the aid of image quality high frequency features and multivariate regression analysis.

In another approach, instead of assessing the iris texture high frequency components, one might assess the resulting iris code directly by using two different localized patches and XOR-ing them to measure discrepancies between the corresponding bits of the two patches. Cross-matching with few discrepancies should indicate blurring effects and vice versa. Other standard quality measures may be used to measure the similarity among the two patches; the more blur the iris map is, the more similar the localized patches are. One might consider measuring the similarity of the two patches by measuring the MSE between the patches intensities, the correlation of the two patches, statistical similarity, contrast difference, or peak signal to noise ratio among the two patches. Let $L(x,y)$, and $R(x,y)$ present the first and second patch, one may formulate these metrics as follows.

$$MSE \text{ measure}: q_0 = \frac{1}{N(R)} \sum_{R,L(x,y)} (R(x, y) - L(x, y))^2$$

where N(R) is the number of pixels within each patch.
Correlation measure:

$$q_1 = \frac{\sigma_{LR}}{\sigma_L \sigma_R};$$

where $$\sigma_{LR} = \frac{1}{(N(R)-1)} \sum_N (R(x, y) - \overline{R})(L(x, y) - \overline{L})$$

Statistical similarity $$q_2 = \frac{\overline{L}\overline{R}}{(\overline{L})^2 + (\overline{R})^2};$$

where $\overline{R}, \overline{L}$ are the average values of image intensities within the patches. Last but not least, we can measure the contrast similarity using the following metric:

$$q_4 = 2 \frac{\sigma_L \sigma_R}{(\sigma_L^2 + \sigma_R^2)}$$

High frequency and blurring metrics may be noted. It may be shown that even small amount of motion blur significantly degrades performance independent of whether images were captured from an off-angle or frontal pose.

The present system may provide an approach for quantifying the blurring effect on the iris map based on an observation that blur induces a distortion of local frequency components in the iris patterns in terms of amplitude and phase which lead to a high-frequency energy loss. The present solution may be based on high frequency distortions among the coarse and fine wavelet coefficients. This approach may be used to detect blur by comparing the linear frequency distortion filter outputs at multiple stages of a dyadic decomposition to measure the discrepancy among the scales and measure their impact on the phase. One may note that any affect on the amplitude should not have any impact if only phasor information is used to encode the iris. If no high frequency distortion measure is reported, then the iris image has already gone through blurring degradation effect. On the other hand, if a discrepancy measure is significant then this implies a distortion has occurred and the original signal has contained all its iris high frequency components with no blurring effects.

Multi-resolution analysis may provide a convenient way for representation of localized signal features such as iris texture patterns because it is widely recognized as a great way to present the localized information in the signal both in spatial and frequency domains. It is for these reasons that one may deploy wavelet decomposition as the framework for a solution presented herein. Wavelet decomposition may be better suited than Fourier transform because of the varying nature of frequency components in an iris image. In the present approach, the behavior of high frequency components at different scales in the vicinity of iris pattern features may be explored to measure the blurring amount in an image. The present approach may be based on the fact that when an image is blurred through convolution with a symmetric linear filter, the low frequency information in the Fourier domain does not necessarily change. However, the local high frequency phasor and amplitude information may be affected by the filtering mechanism. Since the present encoder may be based upon the phase information, then any blurring will directly impact the encoded iris-code.

Figure 4:
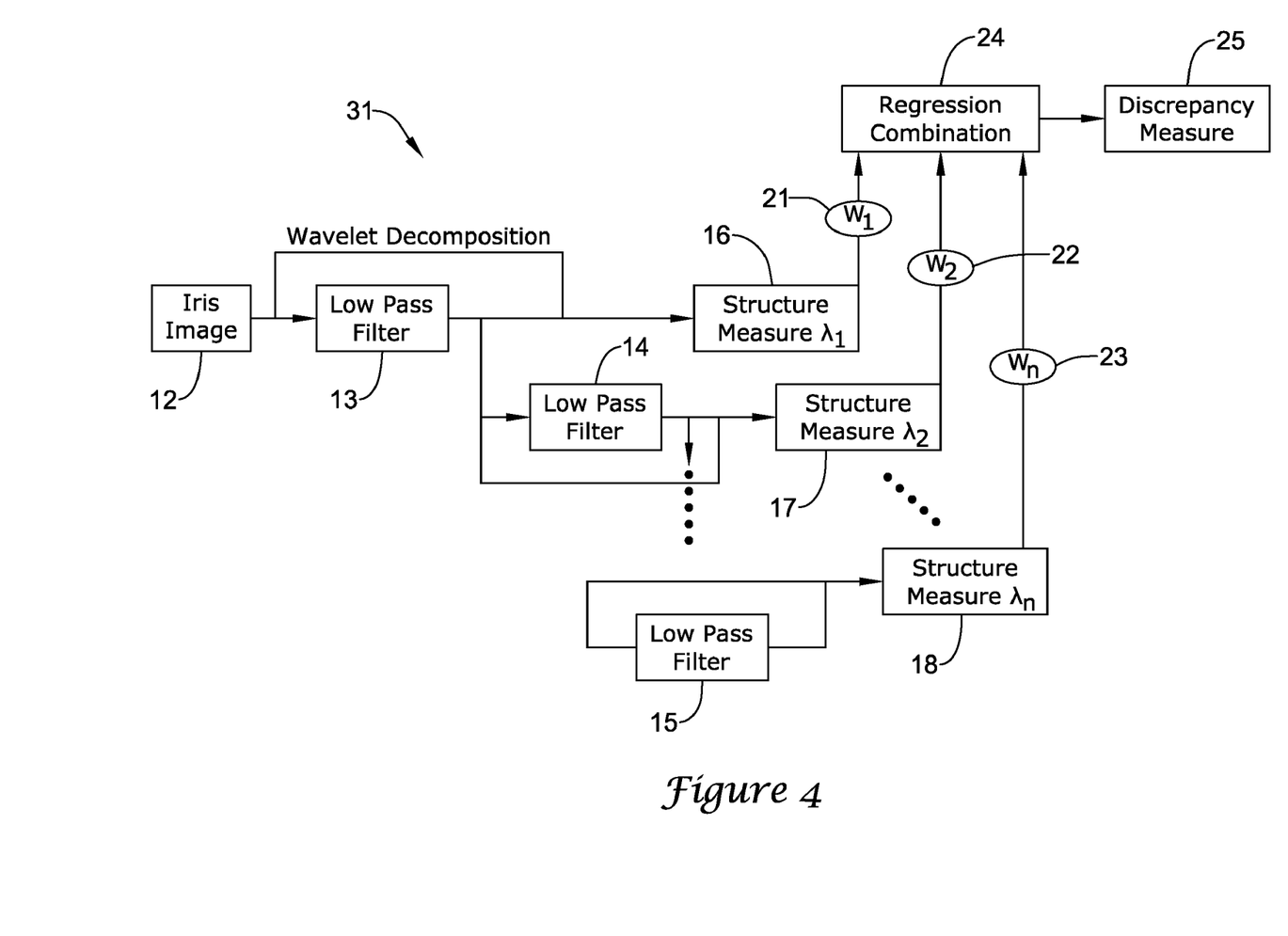
FIG. 4 is a diagram of an arrangement for measuring an iris image discrepancy.

FIG. 4 shows a diagram of the module 31 for providing measurements of blur. An iris image 12 signal may enter a low pass filter 13 and go on a level 1 structure measure $\lambda_1$ module 16. An output of filter 13 may go to a low pass filter 14 and go on to a level 2 structure measure $\lambda_2$ module 17. An output of filter 14 may go to a low pass filter 15 and go to a level n structure measure $\lambda_n$ module 18. There may be a number of low pass filters situated between filter 14 and filter 15 and a like number of structure measure $\lambda$ modules situated between structure measure $\lambda_2$ module 17 and structure measure $\lambda_n$ module 18, with similar connection arrangements. The cutoff frequency of each Low pass filter may be set to investigate specific bands of frequencies. Similarly, the outputs $w_1$ 21, $w_2$ 22, . . . and $w_n$ 23 from the respective structure measure $\lambda$ modules may go to a regression combination module 24. The output of module 24 may be a measure of blur or discrepancy in image 12. The particular measure of discrepancy among the coarse and fine wavelet coefficients of the iris map may be indicated by the following equation.

$$\lambda_n = Dscr(I_{w_n}(x,y), I_{w_{n-1}}(x,y))$$

The distortion (discrepancy) measure of the quality of iris image may be measured on the basis of the structural difference among these coarse-fine wavelet coefficients of the iris image or, in other words, the structural difference between the observed image at each scale and its filtered version.

The inner product between the unbiased variance with respect to the product of the variance may be used to quantify the structural similarity. In order to avoid instability, in case either variance is null, the quantity may be modified to $$\lambda_n = \min\left\{2\frac{\sigma_{n(n-1)}}{\sigma_n \sigma_{(n-1)}} - 1, 2\frac{(1-\sigma_{n(n-1)})}{(1-\sigma_n\sigma_{(n-1)})} - 1\right\}, \quad (2)$$

where is the $\sigma_n$ variance at scale n, the variance $\sigma_{n-1}$ at scale (n−1), and the covariance term may be defined as $$\sigma_{x(n-1)} = \frac{1}{MN}\sum_{i,j}(I_{W_n}(x_i, y_j) - \mu_n)(I_{W_{n-1}}(x_i, y_j) - \mu_{n-1}). \quad (3)$$

Incidentally, one may note the blur image quality assessment and that a structure comparison may be conducted on the statistical normalization of the specified iris image ROIs and thus equation (1) may imply equation (2).

The elements in the finer level may be compared prior to a decimation operation for dimensional consistency. These local statistics may be computed within a kernel L×L square window, which being convolved across the predefined regions of interest (ROIs) that represent an iris map. The width of the kernel L may be chosen to represent a typical iris texture size. At each scale, the local statistics and the distortion measured within the local window may be computed. At each level, one may require a single overall quality measure of the discrepancy. One may utilize an expected average value of measure using a mean or median to evaluate the distortion measure. In other approaches here, one may include additional classical metrics to compare the statistical difference between a coarse scale image and its filtered image at the finer scale. This is possible since the regression analysis may depict the most contributing indices to result into the final decision. In addition, it is recommended that the choice of ROIs be limited to only areas that exhibit iris textures. Multiple ROIs may be treated separately to be weighted appropriately within the regression analysis. One may identify each of iris areas to be at the inner borders of the iris.

In addition, one may combine the outcome of different scales using a multivariate regression approach on the selected quality metrics of multiple scales trained based on some predefined samples of captured irises.

One may then adopt a regression approach to combine the quality indices into a final decision measure. The present metric indices may already be scaled in equation (2) to vary between −1 and 1; thus, one may define the weighting vector based upon the LS solution being $\vec{\omega} = D^+ \vec{v}$, where $D^+ = (D^T D)^{-1} D^T$, the pseudo inverse of the matrix of quality indices elements per each iris sample and per each quality index. The vector $\vec{v}$ may be the resulting indices for the trained set.

Testing appears to indicate that the present approach is able with reasonable accuracy to distinguish between blurred images and non-affected images.

In a different embodiment, one might decompose the two localized patches (i.e., iris regions at the left and right iris-sclera borders) using the same wavelet concept and compare the coefficients of the two decompositions at all levels. Regression combination may then be applied to the output of these structure measures similar to the above example to measure discrepancy among the two patches and not among the levels. No low pass filters are needed in this composition.

In a different example, instead of assessing the iris texture, one might assess the iris code directly using the localized patches and XOR them to measure a discrepancy among the bits, which may be aided with the following equation.

$$m_b = \Sigma[M(\phi_R)]XOR[M(\phi_R + \Delta\phi)] \leq \eta_g$$

Motion blur and smearing effects may be related to defocusing. Defocus is isotropic in nature as pixels of an image may be smeared at all directions and be measured as a blurring effect. Defocus may be assessed by measuring high frequency contents within the iris map after using a median filter to eliminate the salt/pepper type of noise. A local phase technique may be noted. The present approach may include the XOR equation provided herein.

Eye closure and exposure of the iris map may affect primarily the segmentation modeling as it is expected to extract the pupil in its entirety to enable an analysis of the iris textures surrounding it. If the eye is not open enough or some of the pupil region is not visible, such condition may affect the localization of the iris edges or change some of the algorithms modeling assumptions.

Eye closure may be assessed using the iris inner border profile. Several parameters may be formulated to evaluate the estimated border profile including a fitness parameter to measure how far the detected curve from an elliptic like shape, and a parameter defined to measure how much of eye closure there is.

Eye closure may be assessed using the pupil profile. Several parameters may be formulated to evaluate the estimated pupil profile. It may incorporate the following formula.

$$\eta_1 = \frac{1}{N}\oint_{Blob} u\left(\left|\frac{F(x, y) - f(x, y)}{F(x, y) - F_c(x, y)}\right| - \varepsilon\right)dxdy$$

In the above equation, the curve f(x,y) represents the boundary of the blob, F(x,y) is the border curve of estimated fitting shape, and $F_c(x,y)$ is the moment center of the model shape. N in the above equation represents the length of the curve f(x,y). the operator u( ) is the step function and $\varepsilon \ll 1$ is a tolerance factor.

Another is measuring the proportion of the blob within the estimated model curve. A fitting metrics may be basically the ratio of the estimated shape surface coverage or intersection of the surface of the model and the blob over the blob surface.

$$\eta_2 = \frac{\text{Surface}(blob \cap F(x, y))}{S_{blob}},$$

where $S_{blob}$ is the surface of the blob. Iris quality metrics may include iris criteria. Eye closure may be assessed using the pupil profile. The parameters may be formulated to evaluate the estimated pupil profile with the boundary elliptic profile, and the coverage of pupil parameter as noted herein.

Obscuration and occlusions, due to presence of long dense eyelashes or normal closure of eyelids, may affect dramatically the segmentation and the encoding scheme of the recognition system. Iris obscuration may be assessed by computing the integral of the area between the eyelid curve and iris inner boundary. An eyelid-eyelash obscuration assessment may assume that the eye is open enough with most of the pupil being visible but still with the eyelids or eyelashes obscuring the iris texture. The assessment of this criterion may be inherited in the present POSE segmentation technique that provides a way to detect simultaneously the edges of the iris and eyelids and or eyelashes. One may assess or measure iris obscuration by computing the integral of the area surface under the eyelash/lid detected curve and the inner iris or pupil boundary with the following equation.

$$m_o = \int_{\Theta_1 \to \Theta_2} (r(\theta) - r_p(\theta)) d\theta \geq \eta_o$$

Off-angle and eye gazing may be a significant concern in an iris recognition system. Eye gazing is not necessarily considered as a separate issue in the present system since off-angle eye acquisition can be like other eye acquisition here. An off-angle eye not looking forward or directly at an acquisition system may be problematic for some related iris detection mechanisms. Off-angle (gazed eyes) may be assessed in the iris outer boundary shape fitting.

Although, one may design the present iris recognition processes to handle also off-angle eyes, one may want to make an assessment of this IIQM so that special treatment is devoted to the image analysis. The present approach used to assess off-angle (gazed eyes) may be measure the shape fitness of the outer boundary of the iris to a circular shape. Here, the following equation may be noted.

$$m_g = \frac{1}{\pi R^2} \sum_{\Theta_R} u(|(I_R(\theta) - R)| - \vartheta) \geq \eta_g$$

A strong specular reflection may be a concern and affect the contrast of the region being shined and thus affect the segmentation approach as well as the features in the iris texture. An amount of reflection may be assessed using the iris curve fitting and the high contrast thresholding.

Pupil dilation may affect iris recognition performance; however, a good segmentation technique may handle such dilation to a certain extent. Pupil extreme dilation may be detected by evaluating the limits of the pupil edge detection. It is expected that the edges of the pupil may be detected within limits of a predefined range set for a normal range of operation of a pupil dilation. In case that the limit is reached for at all angles, this may indicate that the detected edges do not reflect the actual edges of the pupil and redefinition of the limits are necessary.

Some segmentation approaches may be designed to overcome pupil dilation. However, it has been noted that in some cases, the pupil dilation is significant enough that it may impact the segmentation. The present approach for assessing pupil dilation may be as follows. The iris map may be a region at the inner border of the iris and extend enough to cover a major segment of the iris without reaching the outer border. During inner boundary estimation, one may intentionally limit the map to a region less than the outer boundaries to avoid any obscuration or noise interference that may affect the map structure. It is expected that the edges of the pupil may be detected within limits of a predefined range defined for a normal range of operation of pupil dilation. In case that the limit is again reached for at all angles, this may indicate that the detected edges do not reflect the actual edges of the pupil and that redefinition of the limits appears necessary.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A computer implemented iris image quality metric system comprising:
   a device for acquiring an iris image; and
   a data-processing apparatus;
   a quality processing module connected to the device;
   wherein the quality processing module is executed by the data-processing apparatus, the module and data-processing apparatus are operated in combination to provide a quality assessment of an iris image;
   wherein the quality assessment of the iris image includes an assessment of image blur; and
   image blur is measured according to high frequency distortions from coarse to fine wavelet coefficients.

2. The system of claim 1, wherein the quality assessment of an iris image further includes an analysis of one or more of the following image conditions which comprise:
   defocus;
   closure;
   obscuration;
   off-angle detection;
   reflection; and/or
   excessive dilation.

3. The system of claim 1, wherein a quality assessment of the iris image includes an analysis of the iris image relative to iris obscuration including a computation of an integral of virtually total area between an eyelid curve and an iris inner boundary of an eye from which the iris image is taken.

4. The system of claim 1, wherein a quality assessment of the iris image includes an analysis based on an XOR-ing of codes of two patches of the iris image to measure a discrepancy among bits of the patches.

5. The system of claim 1, wherein a quality assessment of the iris image includes an analysis based on measuring similarity of two patches of the iris image using contrast similarity, intensity distribution similarity, peak signal to noise ratio, and/or correlation between intensities of the two patches.

6. The system of claim 1, wherein a quality assessment of the iris image includes an analysis of the iris image relative to an amount of reflection by the iris in the image including an iris curve fitting and a contrast thresholding.

7. A computer implemented iris image quality metric system comprising:
   a device for acquiring an iris image;
   a data-processing apparatus; and
   a quality processing module connected to the device;
   wherein the quality processing module is executed by the data-processing apparatus, the module and data-processing apparatus are operated in combination to provide a quality assessment of an iris image;
   wherein a quality measurement relative to blur and/or defocus of the iris image is based on a measurement of energy at high frequencies of the spectral domain of the image;
   wherein the measurement of energy at high frequencies of the spectral domain of the image is compared to a measurement of energy at high frequencies of the spectral domain of the image without blur and/or defocus; and
   an amount that the energy at high frequencies of the spectral domain of the image is less than the energy at high frequencies of the spectral domain of the image without blur and/or defocus is proportional to the blur and/or defocus of the image.

8. A computer implemented iris image quality metric system comprising:
   a device for acquiring an iris image;
   a data-processing apparatus; and a quality processing module connected to the device;
wherein the quality processing module is executed by the data-processing apparatus, the module and data-processing apparatus are operated in combination to provide a quality assessment of an iris image;
wherein the quality assessment of the iris image is according to blur;
blur is measured according to high frequency distortions from coarse to fine wavelet coefficients; and
wherein the high frequency distortions among the coarse to fine wavelet coefficients are indicated by a comparison of linear frequency distortion filter outputs at multiple stages of a dyadic decomposition to measure a discrepancy among the stages.

9. A computer implemented iris image quality metric system comprising:
a device for acquiring an iris image;
a data-processing apparatus; and
a quality processing module connected to the device;
wherein the quality processing module is executed by the data-processing apparatus, the module and data-processing apparatus are operated in combination to provide a quality assessment of an iris image;
wherein the quality assessment of the iris image is according to blur;
blur is measured according to high frequency distortions from coarse to fine wavelet coefficients; and
wherein high frequency content is compared at wavelet decompositions between two patches of the iris image for similarity purposes.

10. The system of claim 1, wherein a quality assessment of the iris image includes an analysis of the iris image relative to eye closure including an analysis of an inner border profile of the iris in the image.

11. The system of claim 10, wherein the inner border profile is estimated according to a measurement of an amount that a detected curve of the profile is similar to an elliptic-like shape, and a measurement of an amount of exposure of a map of the iris.

12. A computer implemented iris image quality metric system comprising:
a device for acquiring an iris image;
a data-processing apparatus; and
a quality processing module connected to the device;
wherein the quality processing module is executed by the data-processing apparatus, the module and data-processing apparatus are operated in combination to provide a quality assessment of an iris image; and
wherein a quality assessment of the iris image is according to a comparison of a location of edges of the pupil with a set of defined limits for normal operation of a pupil dilation.

13. A computer implemented iris image preprocessing system comprising:
a device for acquiring an iris image;
a data-processing apparatus;
an iris image module executed by the data-processing apparatus;
an iris image quality measurement module executed by the data-processing apparatus and connected to the iris image module;
an evaluator connected to the iris image module;
a rehabilitator connected to the evaluator;
wherein:
the evaluator receives a quality measurement of an iris image from the quality measurement module, indicates whether the iris image is acceptable or unacceptable for further processing, and indicates whether an iris image that is unacceptable should be rejected or be rehabilitated for further processing; and
the rehabilitator conditions the image by one or more of pixel processing, contrast balancing, histogram equalization, image blind deblurring, adaptive filtering for iris texture restoration, and pose normalization.

14. The system of claim 13, further comprising an image segmentation module connected to the iris image module, the image segmentation module performing one dimensional polar segmentation on the iris image.

15. A computer implemented method for assessing quality of an image comprising:
receiving an iris image from an iris image acquiring device;
measuring at least one quality of the iris image using a data-processing apparatus including a quality processing module;
evaluating the at least one quality to determine whether the iris image is adequate relative to the at least one quality for further processing;
determining whether an iris image, which is not adequate relative to the at least one quality for further processing, is adequate for rehabilitation;
if the iris image is adequate for rehabilitation, conditioning the image by one or more of pixel processing, contrast balancing, histogram equalization, image blind deblurring, adaptive filtering for iris texture restoration, and pose normalization.

16. A computer implemented method for assessing quality of an image comprising:
receiving an iris image from an iris image acquiring device;
measuring at least one quality of the iris image using a data-processing apparatus including a quality processing module;
evaluating the at least one quality to determine whether the iris image is adequate relative to the at least one quality for further processing;
measuring a first energy, at high frequencies, of the spectral domain of the iris image;
determining a second energy, at high frequencies, of the spectral domain of a model iris image which is adequate for further processing; and
wherein if the first energy is within a set percentage of the second energy, then the iris image is adequate, relative to the at least one quality, for further processing.

17. A computer implemented method for assessing quality of an image comprising:
receiving an iris image from an iris image acquiring device;
measuring at least one quality of the iris image using a data-processing apparatus including a quality processing module;
evaluating the at least one quality to determine whether the iris image is adequate relative to the at least one quality for further processing;
obtaining two different localized patches from an iris code of the iris image;
XOR-ing the two patches;
measuring an amount of discrepancy among cross-matched bits of the two patches;
determining whether the amount of discrepancy is greater than a set amount; and
wherein if the amount of discrepancy is greater than a set amount, then the iris image is adequate, relative to the at least one quality, for further processing.

18. A computer implemented method for assessing quality of an image comprising:

receiving an iris image from an iris image acquiring device;

measuring at least one quality of the iris image using a data-processing apparatus including a quality processing module;

evaluating the at least one quality to determine whether the iris image is adequate relative to the at least one quality for further processing;

measuring an amount of difference between the inner border profile in the iris image and an elliptic-like shape; and measuring a percentage of the iris map of the iris image that is exposed; and wherein:

if the amount of difference is less than a set difference for an iris image adequate for further processing relative to the at least one quality, then the image is adequate for further processing relative to the at least one quality; and if the percentage is greater than a set percentage for an iris image adequate for further processing relative to the at least one quality, then the image is adequate for further processing relative to the at least one quality.

* * * * *